United States Patent
Hsu

(10) Patent No.: US 6,427,571 B1
(45) Date of Patent: Aug. 6, 2002

(54) VENETIAN BLIND CUTTING MACHINE

(75) Inventor: Pey-Son Hsu, Changhua Hsien (TW)

(73) Assignee: Ching Feng Blinds Ind. Co., Ltd., Changhua Hsien (TW)

( * ) Notice: Subject to any disclaimer, the term of this patent is extended or adjusted under 35 U.S.C. 154(b) by 90 days.

(21) Appl. No.: 09/644,834

(22) Filed: Aug. 24, 2000

(51) Int. Cl.[7] ............................................. B23D 23/00
(52) U.S. Cl. ........................... 83/454; 83/464; 83/468; 83/468.7; 83/485; 83/29; 83/24.5
(58) Field of Search ..................... 83/454, 464, 467.1, 83/468, 468.7, 468.4, 478, 485, 923; 29/24.5; 82/158, 159, 161; 407/42

(56) References Cited

U.S. PATENT DOCUMENTS

| | | | |
|---|---|---|---|
| 17,518 A | * 6/1857 | Rodeboy | 83/478 |
| 19,906 A | * 4/1858 | Beadle | 83/464 |
| 407,523 A | * 7/1889 | Greg | 83/464 |
| 4,907,325 A | * 3/1990 | Hsu | 83/404 |
| 5,033,344 A | * 7/1991 | Ohneda et al. | 83/485 |
| 5,799,557 A | * 9/1998 | Wang | 29/24.5 |
| 5,927,172 A | * 7/1999 | Wang | 83/454 |
| 6,003,217 A | * 12/1999 | Graves et al. | 29/24.5 |
| 6,003,218 A | * 12/1999 | Schumann et al. | 29/24.5 |
| 6,079,306 A | * 6/2000 | Liu | 83/454 |
| 6,240,824 B1 | * 6/2001 | Hsu | 29/24.5 |

* cited by examiner

Primary Examiner—Kenneth E. Peterson
Assistant Examiner—Stephen Choi
(74) Attorney, Agent, or Firm—Bacon & Thomas, PLLC

(57) ABSTRACT

A Venetian blind cutting machine is provided for cutting blinds produced in several sizes into a required size. Venetian blinds produced in several proper sizes are selected by consumers and are then cut into various sizes to meet their exact needs by the cutting machine. This blind cutting machine is made up of a retaining mechanism, a cutting mechanism, a corner trimming and a calibrating mechanism. The retaining mechanism is responsible for clamping blinds in place and the cutting mechanism is used to cut a blind into a proper size. The corner trimming and calibrating mechanism has a calibration ruler which permits slats to be placed in abutment for precise measurement and calibration. A mold set disposed on the corner trimming and calibrating mechanism is provided with a multi-faced mold assembly which has various types of knives suit for slats of different specification for trimming the ends of slats into proper round corners. Thereby blinds can be fabricated in a small number of sizes which can be selectively processed by the cutting machine, resulting in reduction of storage amount in warehouses and lowering of production cost.

3 Claims, 5 Drawing Sheets

VENETIAN BLIND CUTTING MACHINE

BACKGROUND OF THE INVENTION

The present invention relates to a Venetian blind cutting machine. Blinds produced in several proper sizes are selected by consumers and are then cut into various sizes to meet their exact needs by the cutting machine. This cutting machine is made up of a retaining mechanism, a cutting mechanism, a corner trimming and calibrating mechanism. The retaining mechanism is responsible for clamping blinds in place and the cutting mechanism is used to cut a blind into a proper size. The corner trimming and calibrating mechanism has a calibration ruler which permits blinds to be placed in abutment for precise measurement and calibration. A mold set disposed on the corner trimming and calibrating mechanism is provided with a multi-faced mold assembly which has various types of knives suit for slats of different specification for trimming the ends of slats into proper round corners. Thereby blinds can be fabricated in a small number of sizes which can be selectively processed by the cutting machine, resulting in reduction of storage amount in warehouses and lowering of production cost.

Generally, conventional Venetian blinds are produced in various sizes to meet consumers' different requirements. It is unavoidable that a large amount of blinds made up of different sized slats are stored in warehouses for consumers' selection in practice. Such a way will cause a problem of production cost relatively too high to be competitive and waste of storage space in warehouses.

SUMMARY OF THE INVENTION

Therefore, the primary object of the present invention is to provide a Venetian blind cutting machine which enables blinds produced in several sizes to be cut into required sizes right on a working spot whereby it can solve the problem of accumulation of blinds of various sizes in a warehouse. Thus, it can make Venetian blind producer more competitive in business.

Another object of the present invention is to provide a Venetian blind cutting machine which makes the production and processing of Venetian blinds in a more ready and cheaper manner, making the production cost lower.

One further object of the present invention is to provide a Venetian blind slat cutting machine which is equipped with a corner trimming mechanism which permits blind slats to be either rounded or not with ease in production with ease.

DETAILED DESCRIPTION OF THE PREFERRED EMBODIMENT

The preferred embodiment of the present invention is given in the following example. First, conventional standardized blinds produced in tens of various sizes are grouped at least in 5 sets. For instance, the size specifications range from 50 cm, 51 cm, 52, . . . 60 cm, 61, 62 . . . 70 cm, 71, 72 . . . 80 cm, 81, 82 . . . to 90 cm, 91, 92 . . . 100 cm. The blinds of 50 cm–59 cm is set in one group but only 59 cm blinds are produced; 60 cm–69 cm is set in another group and only 69 cm blinds are produced; 70 cm–79 cm is set in a third group and only 79 cm blinds are produced; 80 cm–89 cm is set in one further group and only 89 cm blinds are produced; and 90 cm–100 cm is set in one further group and 100 cm blinds are produced. In practical use, consumers can select blinds of proper sizes which are either to be further processed by way of the cutting machine of the present invention or just fit in a Venetian blind.

Figure 1:
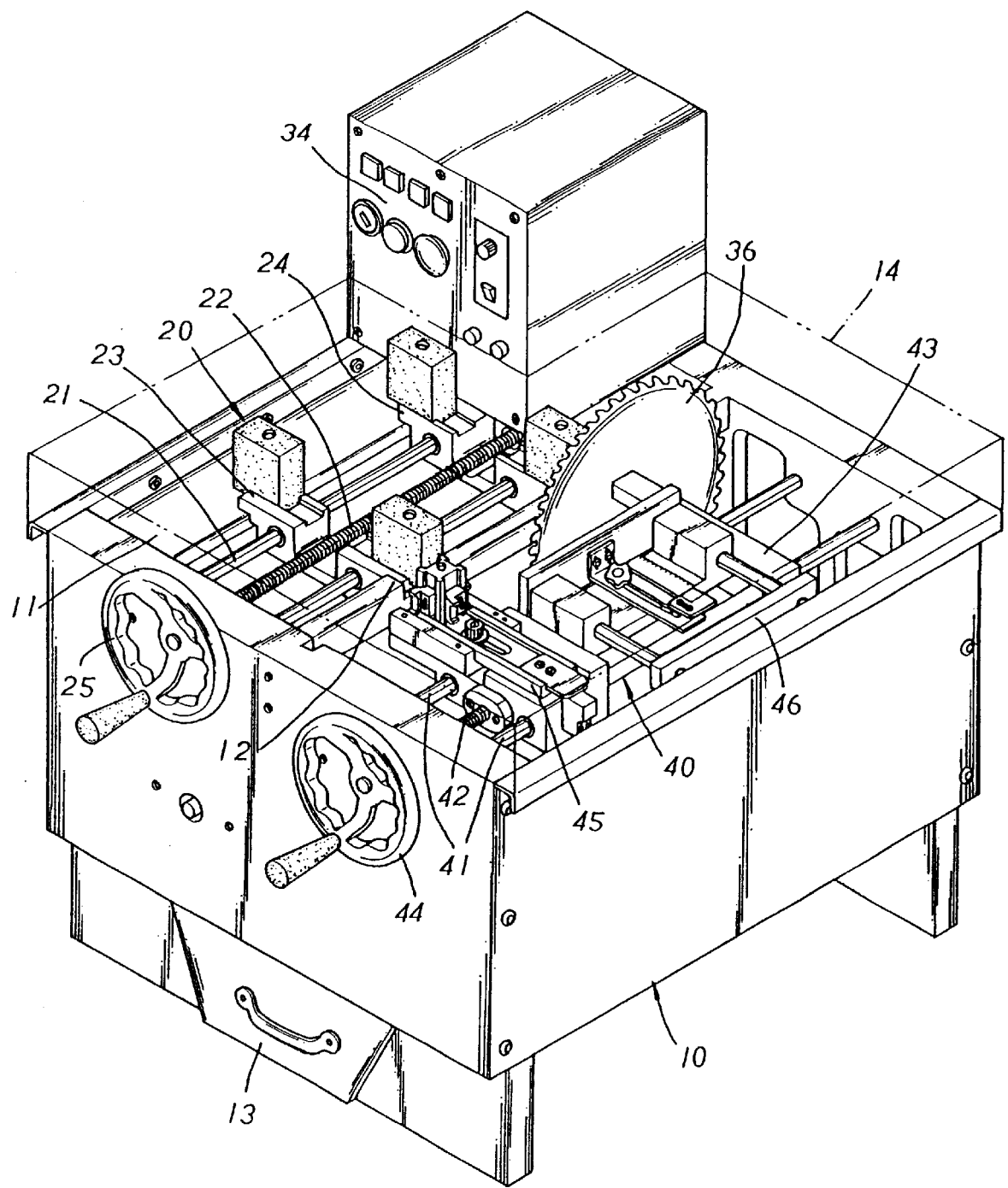
FIG. 1 is a perspective diagram showing the present invention.

Referring to FIG. 1, the blind cutting machine station 10 of the present invention is made up of a retaining mechanism 20, a cutting mechanism 30 and a corner trimming and calibrating mechanism 40.

The cutting machine station 10 is provided with a recessed platform 11 in which a limiting block 12 is disposed. A waste collection drawer 13 is disposed at the bottom of the cutting machine station 10. A transparent shelter cover 14 is positioned at the top of the cutting machine station 10.

Figure 2:
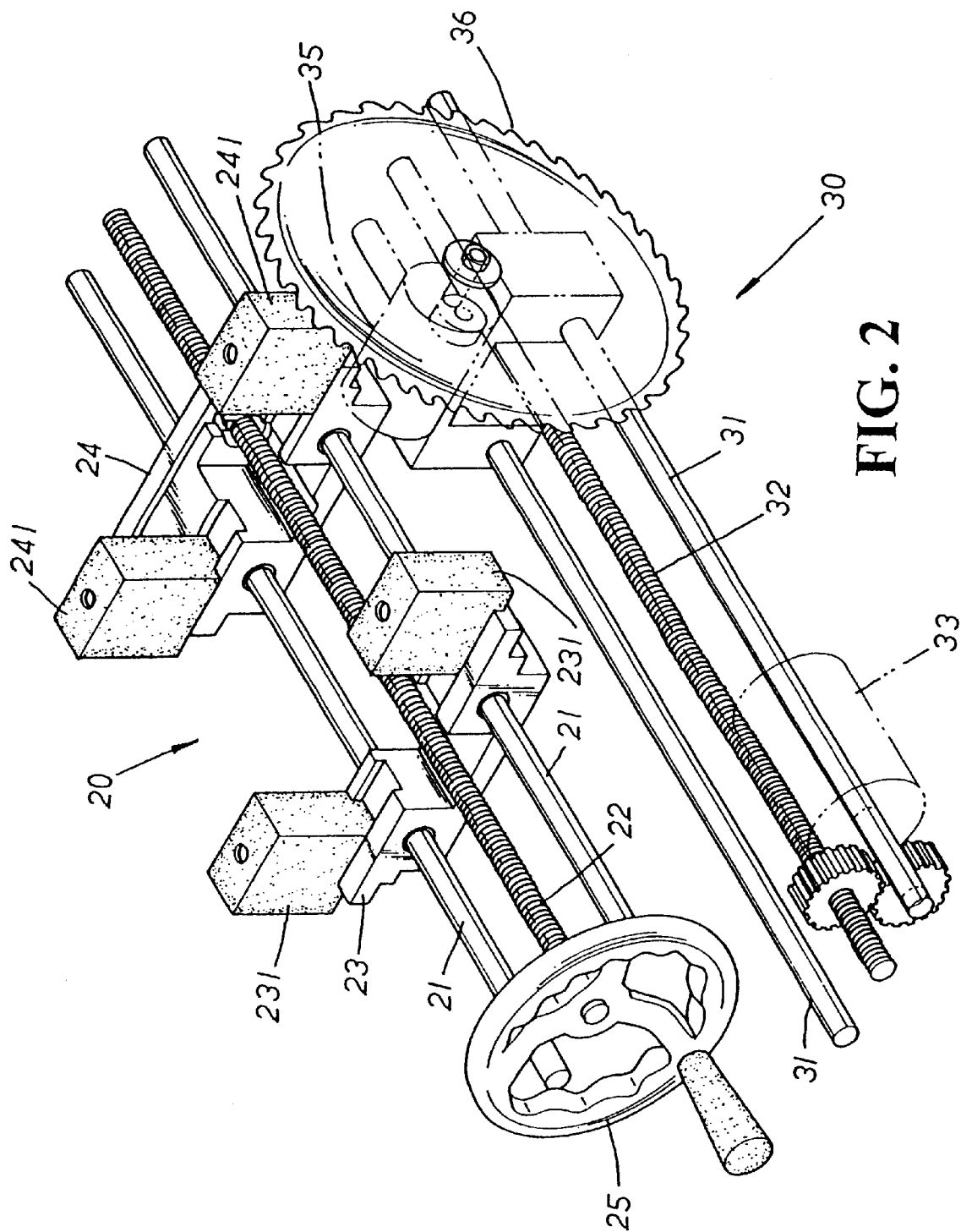
FIG. 2 is a partially enlarged diagram of the part of the present invention.

The retaining mechanism 20 has two parallel bars 21 and a clamping worm 22 that are positioned in the recessed platform 11. At the front end of the two parallel bars 21 is disposed a pair of adjustable front clamp units 23 and a pair of rear clamp units 24 disposed at the rear end of the parallel bars 21 are movable along with the worm 22. To each clamp unit 23 and clamp unit 24 is fixed a retainer block 231 and 241 respectively made of soft material and having a proper thickness. The front clamp units 23 are free to move between the rear clamp units 24 and the limiting block 12. By way of actuation of the adjusting wheel 25 integrally connected to the worm 22, the rear clamp unit 24 is able to adjustably slide on the parallel bars 21, as shown in FIG. 2 which is a partially enlarged diagram of FIG. 1.

The cutting mechanism 30 has two parallel rods 31 and a control worm 32 that are located at the bottom portion of the recessed platform 11 of the blind slat cutting machine station 10. The control worm 32 can be activated to spin by a forwarding motor 33 and a control panel 34. A wheel saw 36 driven by a rotation motor 35 is mounted onto the parallel rods 31 and the control worm 32. The rotation motor 35 is controlled by the operation on the control panel 34. The wheel saw 36 is placed at the middle position of the cutting machine station 10, as shown in FIG. 2.

The corner trimming and calibrating mechanism 40 having two parallel bars 41 and a worm 42 is positioned at the right upper corner of the cutting machine station 10 and mounted onto a movable mount 43 which is located on the parallel bars 41 and the worm 42. A control wheel 44 integrally engaged with the worm 42 is used to control the movement of the movable mount 43. To the front side of the movable mount 43 is secured a slidable mold seat 45 which is movable along a slide track 451. The mold seat 45 is provided with a long rectangular adjustment slot 452 in which a fixing bolt 453 is located.

At the left end of the mold seat 45 is fixed a multi-faced mold assembly 455 which is secured in place by a bolt 454 in a positioning groove 456 at the top face of the mold seat 45. On each face of the multi-faced mold assembly 455 is provided with a positioning groove 4551 in which is equipped with a knife mold 457. Each knife mold 457 having a long rectangular hole 4571 is fixed to the multi-faced mold assembly 455 and has an arch knife 4572.

Figure 3:
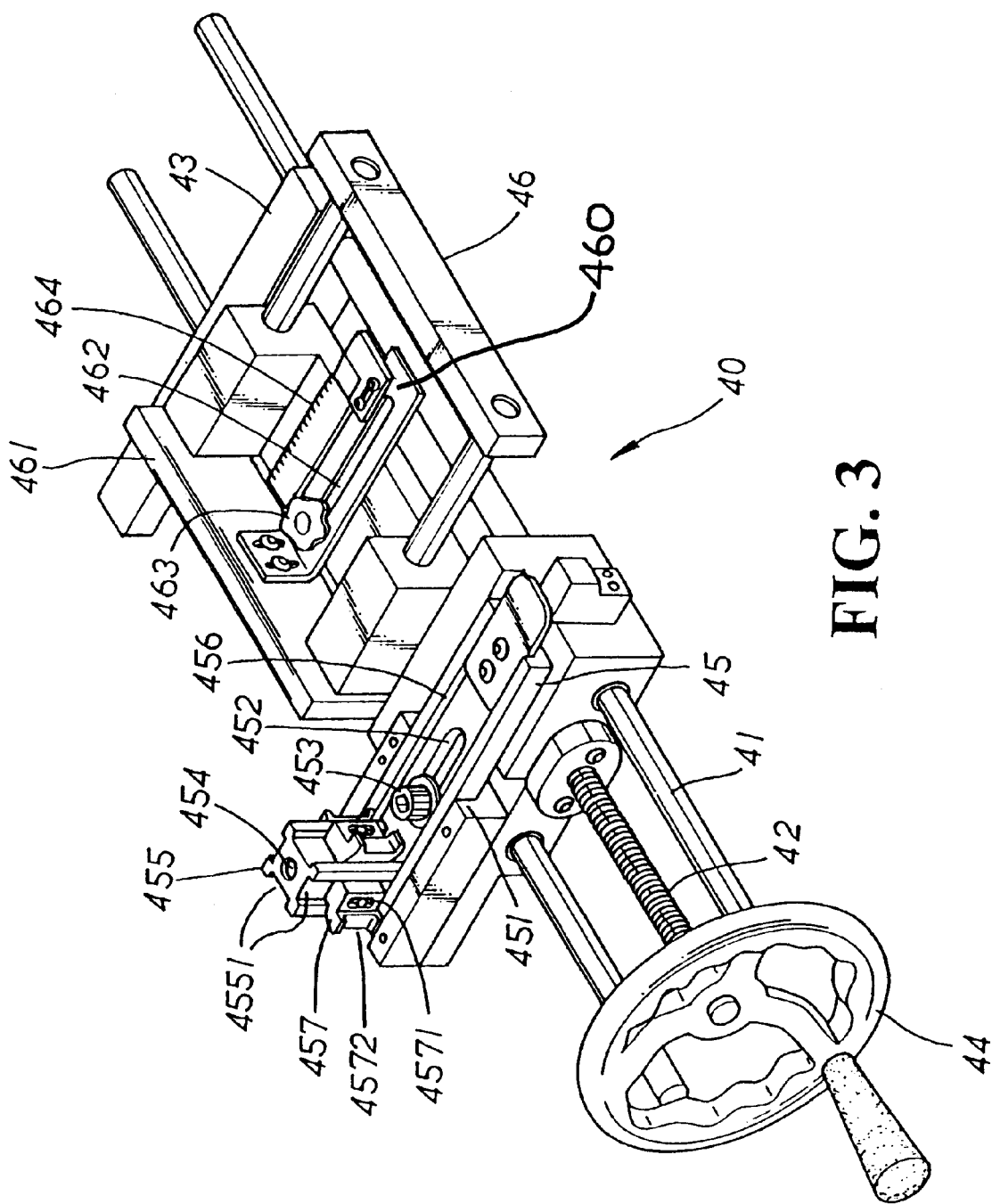
FIG. 3 is a partially enlarged diagram of another part of the present invention.

At the rear side of the movable mount 43 is disposed a measurement ruler device 46 which is laterally movable. At one side of the measurement ruler device 46 is disposed an abutment board 461 and retaining board 460 having a long central adjustment slot 462 can be adjustably locked in position on the movable mount 43 by a butterfly bolt 463. A measurement ruler 464 is fixed to one side of the retaining board 460, as shown in FIG. 3.

Figure 4:
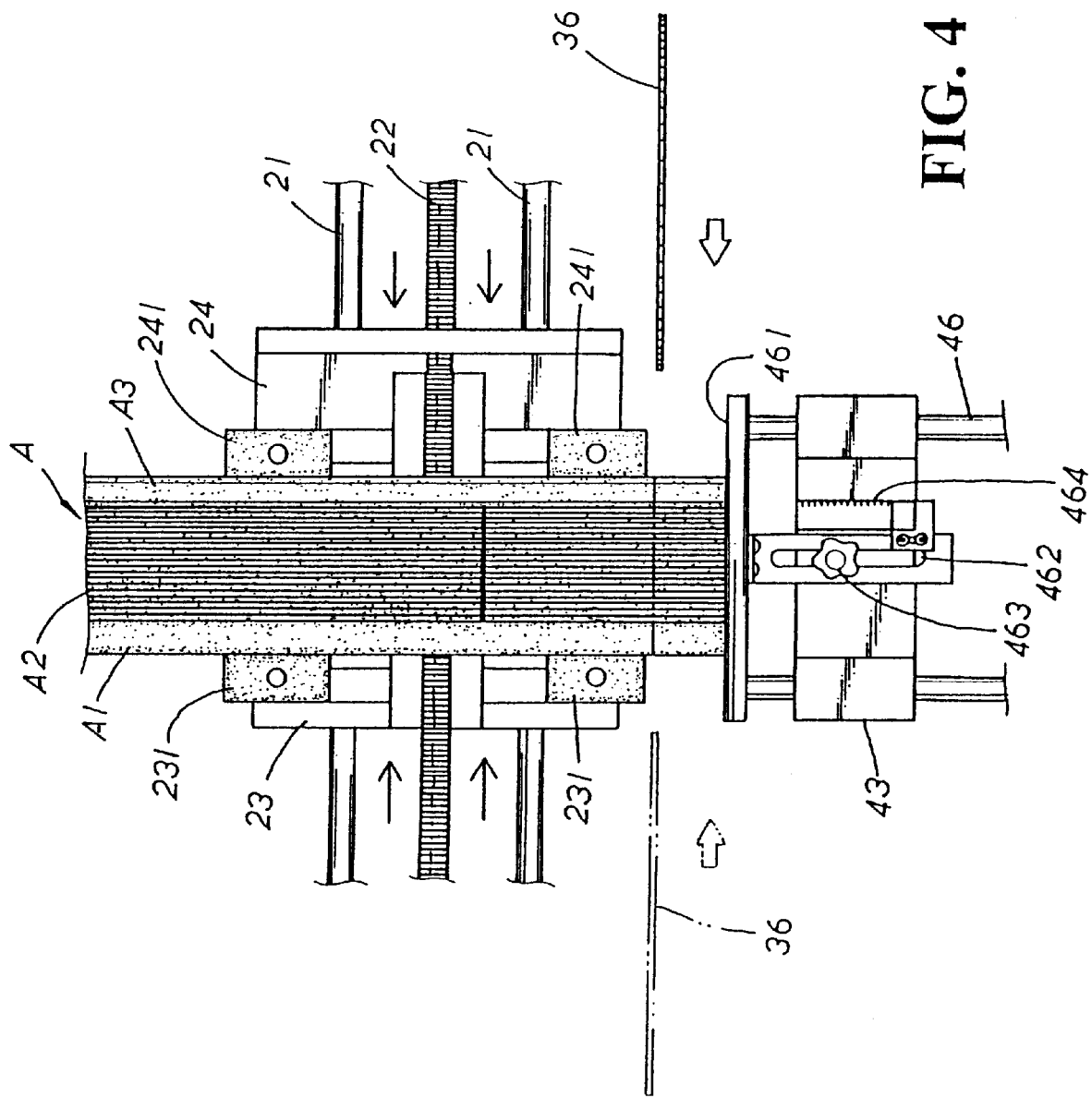
FIG. 4 is a top view diagram showing the cutting operation of a blind.

In cutting a blind slat, as shown in FIG. 4, a Venetian blind assembly A of a proper size is selected and then the butterfly bolt 463 of the measurement ruler device 46 is released for further setting the length to be cut of the Venetian blind assembly at both ends thereof. At the same time, the movable mount 43 of the corner trimming and calibrating mechanism 40 can be driven to move to the recessed platform 11 and be positioned between the retainer blocks 231, 241 of the clamp units 23, 24 of the blind slat cutting machine station 10 by way of the rotation of the control wheel 44. The front end of the Venetian blind assembly A is in abutment against the abutment board 461 of the measurement ruler device 46. Next, the adjusting wheel 25 is rotated to make the worm 22 spin, causing the rear clamp unit 24 to move forward to forcedly abut against the blind assembly. In the meanwhile, the front clamp unit 23 is limited in place by the limiting block 12 of the blind slat cutting machine station 10 whereby the blind assembly A is clamped in place between the retainer blocks 231, 241 of the clamp units 23, 24 in the recessed platform 11 of the cutting machine station 10.

Afterwards, the transparent shelter cover 14 is pivoted down to get the cutting machine station 10 covered. Then the slat cutting mechanism 30 is activated to operate by way of the buttons of the control panel 34. Accordingly, the forwarding motor 33 and the rotation motor 35 are activated simultaneously. The forwarding motor 33 will cause the control worm 32 to spin, resulting in the forward movement of the rotation motor 35 and the wheel saw 36. Moreover, the rotation motor 35 will cause the wheel saw 36 to rotate so as to cut the extended portion of the blind assembly A. The cut portion of the blind assembly A will drop downwardly into the waste collection drawer 13 for easy disposal.

After the wheel saw 36 completes the cutting operation on the Venetian blind assembly A, the wheel saw 36 will withdraw and stop so that the transparent cover 14 can be opened. Then, the adjusting wheel 25 is rotated to get the blind assembly A clamped between the front and rear clamp units 23,24 free.

Figure 5A:
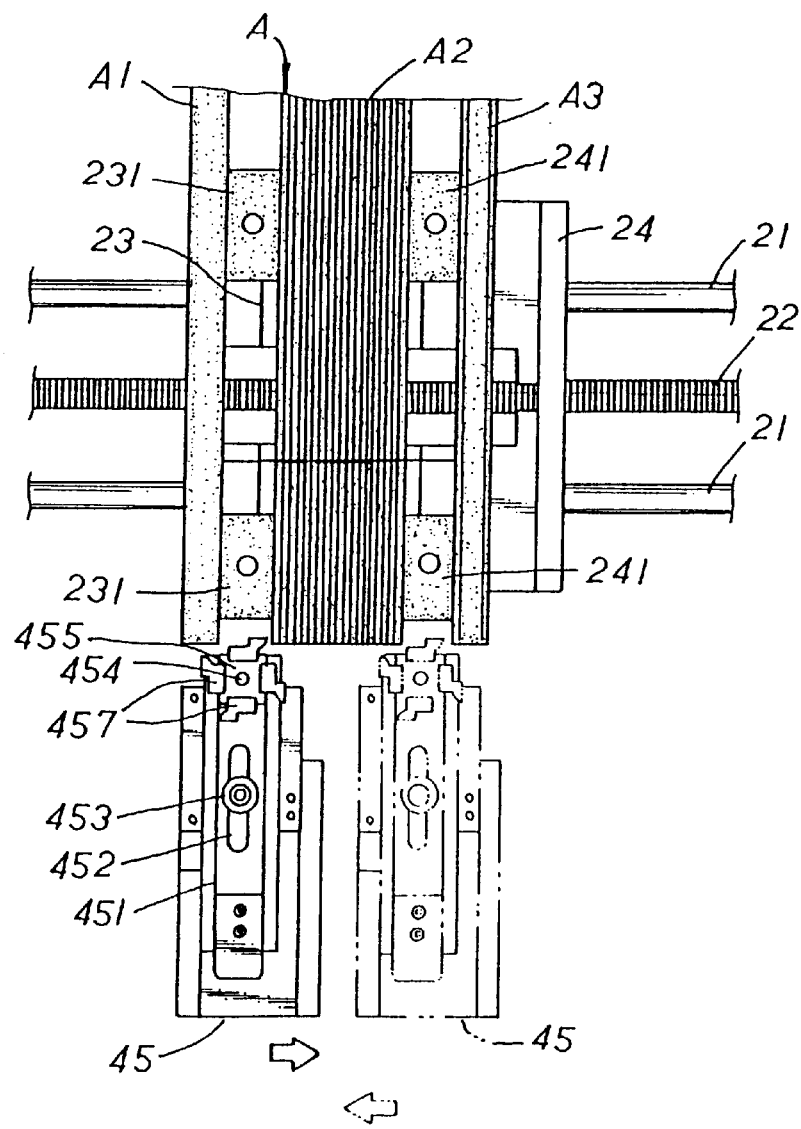
FIG. 5A is a top view diagram showing a corner trimming operation of blind slats.
Figure 5B:
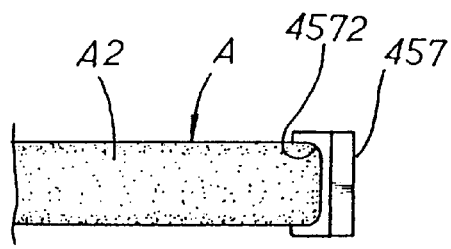
FIG. 5B is a side view diagram showing a corner trimming operation of blind slats.

Referring to FIG. 5A, 5B, the upper beam A1 and the lower beam A3 of the blind assembly A are lifted up and placed to the outer side of the retainer blocks 231, 241 of the clamp units 23, 24. Next, the blind slats A2 are tightly retained in position by the retainer blocks 231, 241 of the clamp units 23, 24. Then the bolt 454 is released to get the multi-faced mold assembly 455 free to selectively rotate to a proper position. One face of the multi-faced mold assembly 455 is fixed in position with a proper knife mold 457 placed at the front side, then the bolt 454 is tightened again and the bolt in the long rectangular hole 4571 is loosened for adjusting the height of the knife mold 457 so as to place the arch knife 4572 of the knife mold 457 in flush with the front side of the slats A2 of the blind assembly A first, and then the bolt in the long rectangular bole 4571 locked in place. Afterwards, the butterfly bolt 463 in the adjustment slot 462 is released to adjust the position of the measurement ruler device 46 so as to position the knife mold 457 in front of the retainer block 231 of the clamp unit 23 and between the slats A2 of the blind assembly A and the upper beam Al and the butterfly bolt is then tightened up. Next, the control wheel 44 is rotated to make the movable mount 43 shift forwardly, permitting the knife mold 457 to move from the retainer block 231 of the front clamp unit 23 to the retainer block 241 of the rear clamp unit 24. In the meanwhile, the arch knife 4572 of the knife mold 457 is engaged with the corners of the slats A2 of the blind assembly A so as to trim the corners of the slats into roundness by shearing force. Then, the adjusting wheel 25 is activated in such a manner that the blind assembly A is released so as to permit the blind assembly A to be changed to the other end for further cutting and corner trimming. Alternatively, corner trimming operation can be saved if desired.

In summary, there are a number of advantages associated with the present invention given as below:

1. Blinds are only prepared in a small number of sizes so as to reduce the amount of blinds of different sizes for storage in warehouses in one aspect; and consumers can easily select a proper size for further processing in another aspect.
2. No extra auxiliary equipment is needed to suit differently sized slats, so cost of production can be lowered effectively.
3. The mold knife is provided with various kinds of knives suitable for different sizes and types of blind slats whereby slats with trimmed corners and non-trimmed corners can be selectively processed to meet different needs of consumers.

I claim:
1. Venetian blind cutting machine comprising:
   a cutting machine station;
   a retaining mechanism,
   a cutting mechanism; and
   a corner trimming and calibrating mechanism;
   said cutting machine station having a recessed platform on which said retaining mechanism, said cutting mechanism and said corner trimming and calibrating mechanism are disposed;
   said retaining mechanism having a front clamp unit and a rear clamp unit adjustably mounted onto a pair of parallel bars that are disposed on said recessed platform; a worm operably engaged with said rear clamp unit being controlled by ah adjusting wheel so as to permit said rear clamp unit to be adjustably controlled by actuation of said adjusting wheel;
   said cutting mechanism having a cutting wheel saw in operational engagement with a rotation motor which is mounted to a slidable seat and is controllable by a panel; said slidable seat being slidably engaged with a pair of parallel bars and a worm that are disposed at a lower portion of said recessed platform of said cutting machine station; said worm engaged with and controlled by a forwarding motor and controlled by said panel; said worm being engaged with said slidable seat so that said slidable seat can be controllably moved forwardly or backwardly by said rotation motor;
   said corner trimming and calibrating mechanism having two parallel bars and a worm being positioned at the right upper corner of said cutting machine station and mounted onto a movable mount which is located on said parallel bars and said worm; a control wheel integrally engaged with said worm being used to control the movement of said movable mount; to a front side of said movable mount being secured a slidable mold seat which is movable along a slide track; said mold seat being provided with a long rectangular adjustment slot in which a fixing bolt is located; at the left end of said mold seat is fixed a multi-faced mold assembly which is equipped with knife molds; each said knife mold has an arch knife; at a rear side of said movable mount is disposed a measurement ruler device which is laterally movable; at one side of said measurement ruler device being disposed an abutment board and retaining board having a long central adjustment slot can be adjustably locked in position on said movable mount by a butterfly bolt; a measurement ruler being fixed to one side of said retaining board; whereby Venetian blind of various sizes can be properly selected and further retained in place by said retaining mechanism and precisely cut into a required size by said cutting mechanism with the help of said corner trimming and calibrating mechanism.

2. The Venetian blind cutting machine as claimed in claim 1 wherein at the left end of said mold seat is fixed said multi-faced mold assembly which is secured in place by a bolt in a positioning groove at the top face of said mold seat; on each face of said multi-faced mold assembly is provided with a positioning groove in which is adjustably located said knife mold.

3. The Venetian blind cutting machine as claimed in claim 1 wherein each knife mold having a long rectangular hole is fixed to said multi-faced mold assembly by a bolt which is led through said long rectangular hole whereby said knife mold can be adjustably moved up and down on said multi-faced mold assembly.

* * * * *